No. 621,622. Patented Mar. 21, 1899.
A. B. SHAW.
FIRE EXTINGUISHER.
(Application filed Sept. 22, 1897.)
(No Model.)
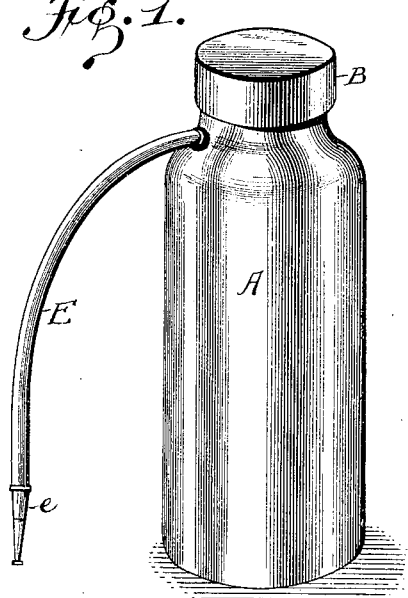
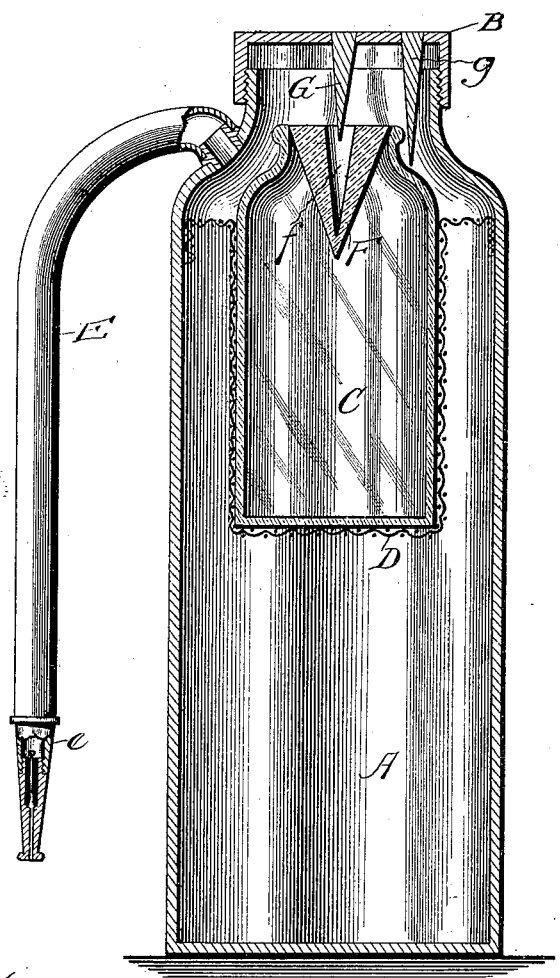
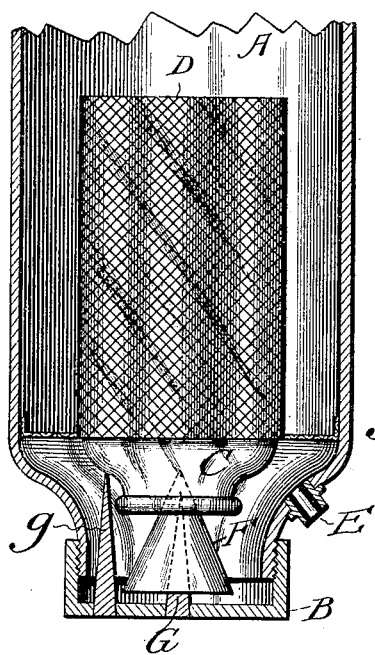
Witnesses  Alexander B. Shaw, Inventor.
By Frank D. Thomason
Attorney

UNITED STATES PATENT OFFICE.

ALEXANDER B. SHAW, OF CHICAGO, ILLINOIS.

FIRE-EXTINGUISHER.

SPECIFICATION forming part of Letters Patent No. 621,622, dated March 21, 1899.

Application filed September 22, 1897. Serial No. 652,669. (No model.)

*To all whom it may concern:*

Be it known that I, ALEXANDER B. SHAW, a citizen of the United States, and a resident of Chicago, in the county of Cook and State of Illinois, have invented certain new and useful Improvements in Fire-Extinguishers, of which the following is a full, clear, and exact description, reference being had to the accompanying drawings and to the letters of reference marked thereon.

My invention relates to those kind of portable fire-extinguishers which are inverted when it is desired to use them, so as to open an inner receptacle containing suitable chemicals and cause to be combined therewith other liquid chemicals in said extinguisher to generate gas which creates pressure sufficient to forcibly expel therefrom the contents of said extinguisher to extinguish the fire.

The object of my invention is to provide simple and economically-constructed devices for directing the movement of the stopper of said inner receptacle and means for supporting said inner receptacle and holding the same in position when the extinguisher is inverted, which, however, will not interfere with the removal of the inner receptacle when the cover of the extinguisher is removed or prevent the charging of said extinguisher. This I accomplish by the means hereinafter fully explained and described, and particularly pointed out in the claim.

In the drawings, Figure 1 is a perspective view of a fire-extinguisher having my improvements applied thereto. Fig. 2 is a vertical central section therethrough, and Fig. 3 is a similar view showing said extinguisher inverted.

In the drawings, A represents the exterior case or shell of a portable fire-extinguisher, the body of which may be cylindrical, as shown, or any other shape desired. The upper end of this shell is preferably reduced in diameter and is provided with an opening normally closed by a cover B, through which access can be had to its interior. The cover B may either screw down over the upper end of the case A or screw into the same or may be otherwise secured in position in any desired manner. In the drawings this cover B is shown to consist of metal, but it is evident it may be made of any suitable material.

Inclosed within the case A is a jar or vessel C, in which said acid or other equivalent substance is placed and which is supported centrally in the upper end thereof by means of a basket D of open wire network. This basket is suspended in the center of said case, away from the sides thereof, by having its upper end edges flanged outward and secured by soldering or otherwise to the inner walls of the case, preferably at a point just below where the reduction in the diameter of the upper end of the same takes place.

The case, at a suitable point above the basket D, has leading therefrom a suitable flexible pipe E, which is provided with a suitable nozzle e, so constructed that it can shut off or control the flow of liquid or other matter discharged therefrom. The nozzle may be of any ordinary construction.

The acid jar or vessel is of such less diameter than the case as to leave a space between the two, and it fits snugly within the basket D and has its upper end preferably reduced in diameter and its mouth closed by a suitable stopper F. In the drawings this stopper F is shown to be of an inverted-cone shape, and it is provided with a longitudinal and vertical hole $f$ in its top, which preferably is greatest in diameter at its mouth and gradually tapers to a point at its inner terminus, which latter is located very near the inverted apex, but does not extend clear through the stopper.

The cover B is provided with a centrally-depending pointed stud G of suitable dimensions, which extends to or nearly to the top of the stopper F, in longitudinal alinement with opening $f$ thereof, and said cover B is also provided at a suitable point between the stud G and its circumference with a downwardly-depending set-pin $g$, which is slightly longer than the stud G and is so located that its lower end nearly comes in contact with the shoulder of the reduced upper end of the acid jar or vessel C.

The parts of my improved extinguisher are assembled, and said extinguisher is charged in the following manner: The cover being removed from the case A, water and carbonate of soda or other suitable substance are poured into the case A and pass without interference through the open wirework of the basket until sufficient has been poured therein. The acid jar or vessel having been previously filled with sulfuric acid or other equivalent chemical is then closed by the stopper F and placed in the basket, care being observed when so doing that the liquid in the case A outside of the jar will not rise above the surface of the mouth and flow into the acid-jar. The cover B is then closed over the upper open end of the case, so as to bring the stud G and the set-pin $g$ into the relative positions referred to. When the extinguisher is to be put into practical use, it is inverted, whereupon the stopper F falls out of the mouth of the jar and is impaled on the stud G, while the jar C is prevented from falling out of and is maintained in position in the basket by the pin $g$. When, however, the extinguisher is "righted" and restored to its original position, the movement of the stud is controlled and directed by the stud G, so that it gravitates back into and again closes the mouth of the acid-jar C. The conical sides of the stopper, near the apex, will when the extinguisher is inverted partially close the mouth of the said jar and to a certain extent will regulate the flow of acid from the jar. This acid flowing from the jar commingles with the fluid outside of the same and generates gas, the pressure of which will forcibly expel the contents of the extinguisher from the pipe while said extinguisher is in its inverted position.

I do not desire to be confined to the exact construction, shape, or dimensions of any of the parts of my improved extinguisher, as it is evident these may be changed or modified without departing from the spirit of my invention.

What I claim as new is—

The combination in a fire-extinguisher with an exterior case having a suitable valve-controlled discharge-opening, a basket suspended in the upper part of said case, and a cover for closing the upper open end of the case which is provided with a centrally-depending stud and set-pin, of a jar or vessel supported in said basket and a stopper therefor having a central hole extending down into it in alinement with and below said stud, said stud directing the movement of said stopper and said set-pin holding the jar within the basket when the extinguisher is inverted.

ALEXANDER B. SHAW.

Witnesses:
P. W. DONIGAN,
JAMES HORSBURGH.